G. VAN WAGENEN.
Breast Collars for Horses.
No. 125,353. Patented April 2, 1872.
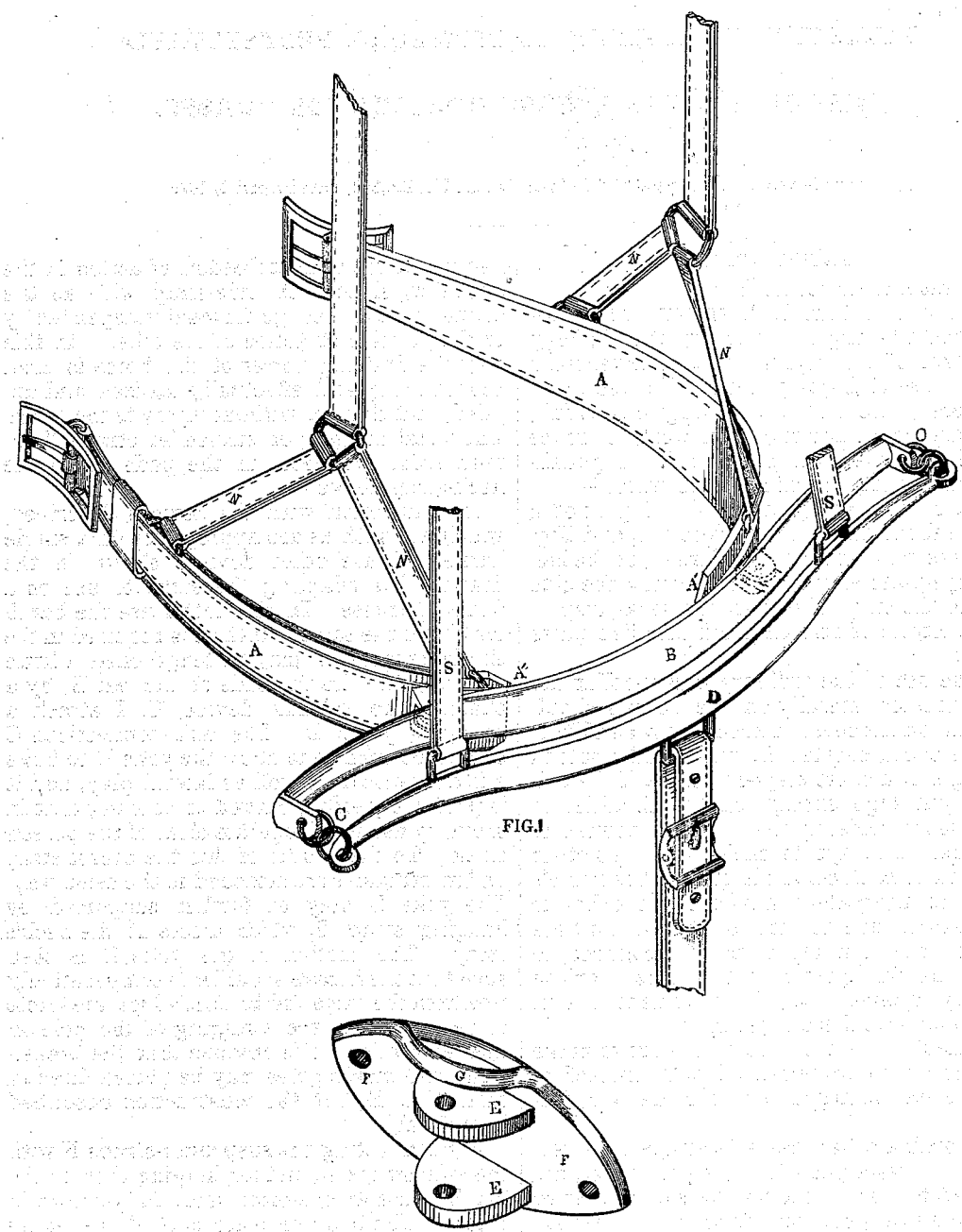

125,353

UNITED STATES PATENT OFFICE.

GARRETT VAN WAGENEN, OF PITTSBURG, PENNSYLVANIA.

IMPROVEMENT IN BREAST-COLLARS FOR HORSES.

Specification forming part of Letters Patent No. 125,353, dated April 2, 1872.

SPECIFICATION.

*To all whom it may concern:*

Be it known that I, GARRETT VAN WAGENEN, of Pittsburg, in the county of Allegheny and State of Pennsylvania, have invented a new and useful Improvement in Harness; and I do hereby declare the following to be a full, clear, and exact description thereof, reference being had to the accompanying drawing making a part of this specification, in which—

Figure 1 is a perspective view of part of a harness illustrative of my invention, and Fig. 2 is a like view, somewhat enlarged, of the metallic eye-plate employed for uniting the side strap to the suspender from the neck-strap.

Like letters of reference indicate like parts in each.

In the use of the ordinary breast-collar the collar presses laterally on the horse's shoulders and on his chest in such a way as to narrow the chest, shorten his wind, and result in making him a short stepper. Also, if the collar be put high enough on the shoulder to utilize most perfectly the drafting powers of the horse, it is apt to choke him. Another objection to such collars is, that as the horse's shoulders alternately advance the collar is shifted from side to side, so that at no time does it present a fair plane of resistance, to which the full power of the horse can be squarely applied. My improvement has in view to obviate these objections.

To enable others skilled in the art to make and use my improvement, I will proceed to describe its construction and mode of operation.

The ordinary harness side-straps A A terminate in breast-pads A' A', which, in use, are designed to rest on the horse's shoulder at or about the best point for drawing. An inflexible bar, B, is pivoted or hinged to each pad, A', by a hinge or other suitable joint, such as will permit the horse advancing either shoulder without shifting the harness laterally. The rigidity of the bar B prevents the side-straps and pads from pressing laterally with too great force, such as to cramp the horse's shoulders. Also, the bar B is curved both forward and downward between the points of hinging, so that it will, when in use, stand clear of the horse's throat. The bar B plays freely on its pivots at each end, and thereby permits of the utmost freedom of action in the shoulder, since each side-strap will, as the shoulder advances, go forward independently of the position or action of the other. In this way the drafting power of the horse is most economically and effectually utilized and applied, and that too without injury to the horse. The usual hanging or suspender straps N extend from eye-pieces in the pads A' to the neck-strap above.

In connection with the devices described, which are such as are appropriate on a single harness, I use other devices shown in the drawing for adapting the same to use on a double harness. In this latter use the bar B may be of the same length as is required in the single harness, or may be lengthened a little at each end. To the ends of the bar B, by a chain, strap, or link device, C, I attach a swinging yoke, D. The link-connections C should be such as to allow the yoke D to have a little vertical as well as lateral play, and it is preferably either curved or so hung that in ordinary use it will operate clear of the horse's chest. To the middle of this the breast-strap and martingales are attached in the usual way. The yoke D may be further supported by hanging strap, S, which meets at the neck's strap. The motion of the yoke D is then such that the horse's shoulder is comparatively free from the jams and bruises which are liable to be caused by the swinging of the pole on uneven roads. It is obvious that the breast-strap and martingales may be placed directly on the bar B, but the construction described is preferable.

For connecting the suspender-straps N with the side straps A, and for hinging thereto the bar B, I use an eye-plate, more fully shown in Fig. 2. The body or plate part F has, on its outer face, the proper projecting lug or lugs E, to which to hinge the bar B. On the upper edge of the plate F is an eye, G, which, at the point of its junction with the plate, is bent outwardly, so as to leave room behind it for a part of the pad to project up in the same plane as the rest of it. Each hanging strap N is attached to such an eye. Of course these eye-pieces must be made "rights" and "lefts," or, if so preferred, the lugs and eye may be put at or about equidistant between the ends, in which case the same eye-plate may be used on either side. But the former construction, as illustrated in the drawing, is preferable.

What I claim as my invention, and desire to secure by Letters Patent, is—

1. In a breast-collar harness, a rigid bar, B, connected by a hinge or pivot-joint to the shoulder-pads A', at a point in each back of the forward end of the pad, where such pads are joined to or form an extension of the side straps A, substantially as set forth.

2. In combination with a rigid bar which connects the ends of the side straps, a swinging yoke, D, hung thereto by a connection which permits of lateral and vertical motion, substantially as described.

In testimony whereof I, the said GARRETT VAN WAGENEN, have hereunto set my hand.

GARRETT VAN WAGENEN.

Witnesses:
A. S. NICHOLSON,
JAMES I. KAY.